(12) United States Patent
Stubner et al.

(10) Patent No.: US 11,075,565 B2
(45) Date of Patent: Jul. 27, 2021

(54) ELECTRICAL MACHINE, AND METHODS FOR PRODUCING AN ELECTRICAL MACHINE

(71) Applicant: Robert Bosch GmbH, Stuttgart (DE)

(72) Inventors: Armin Stubner, Buehl-Altschweier (DE); Christian Meyer, Karlsruhe-Wolfartsweier (DE); Torsten Gmuend, Rastatt-Pliitersdorf (DE); Christian Poddey, Oetigheim (DE); Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 16/087,758

(22) PCT Filed: Mar. 20, 2017

(86) PCT No.: PCT/EP2017/056562
§ 371 (c)(1),
(2) Date: Sep. 24, 2018

(87) PCT Pub. No.: WO2017/162589
PCT Pub. Date: Sep. 28, 2017

(65) Prior Publication Data
US 2020/0303986 A1    Sep. 24, 2020

(30) Foreign Application Priority Data
Mar. 24, 2016 (DE) .................... 10 2016 204 954.2

(51) Int. Cl.
*H02K 5/22*        (2006.01)
*H02K 3/52*        (2006.01)
(Continued)

(52) U.S. Cl.
CPC ............. *H02K 5/225* (2013.01); *H02K 3/522* (2013.01); *H02K 29/08* (2013.01); *H02K 15/00* (2013.01);
(Continued)

(58) Field of Classification Search
CPC ............ H02K 5/22; H02K 5/24; H02K 5/225; H02K 5/06; H02K 5/14; H02K 3/22;
(Continued)

(56) References Cited

U.S. PATENT DOCUMENTS 8,779,641 B2 * 7/2014 Fujii ..................... H02K 29/08
                                                                      310/71
9,991,644 B2 * 6/2018 Kang .................... H02K 5/225
(Continued)

FOREIGN PATENT DOCUMENTS

CN       204271763 U    4/2015
CN       104852528 A    8/2015
(Continued)

OTHER PUBLICATIONS

International Search Report for Application No. PCT/EP2017/056562 dated May 30, 2017 (English Translation, 2 pages).

*Primary Examiner* — Maged M Almawri
(74) *Attorney, Agent, or Firm* — Michael Best & Friedrich LLP

(57) ABSTRACT

The invention relates to an electrical machine (10), in particular an electronically commutated EC motor, and to methods for producing an electrical machine (10) of this type having a pole pot (15), in which a stator (16) and a rotor (18) are received, and a plug housing (33) with an integrated connector plug (37) is arranged axially on the open side of the pole pot (15), wherein a rotor shaft (20) of the rotor (18) protrudes with a free end (80) axially out of the pole pot (15) into the plug housing (33), and a magnetic signal generator
(Continued)

(75) for rotational position detection is arranged at the free end (80), which magnetic signal generator (75) interacts with a magnetic field sensor (77) which lies axially opposite it, wherein the magnetic field sensor (77) is configured as a wired single-part component and is fastened directly to the inner side (29) of the plug housing (33) without the use of a printed circuit board.

19 Claims, 6 Drawing Sheets

(51) Int. Cl.
*H02K 29/08* (2006.01)
*H02K 15/00* (2006.01)
*H02K 15/14* (2006.01)

(52) U.S. Cl.
CPC ......... *H02K 15/14* (2013.01); *H02K 2203/09* (2013.01); *H02K 2211/03* (2013.01)

(58) Field of Classification Search
CPC ........ H02K 3/522; H02K 29/08; H02K 15/00; H02K 15/14; H02K 2203/09; H02K 2211/03
USPC .............................. 310/71, 68 B, 67 R, 68 R
See application file for complete search history.

(56) References Cited

U.S. PATENT DOCUMENTS

| | | | | |
|---|---|---|---|---|
| 10,181,766 B2* | 1/2019 | Haga | .................... | H02K 11/215 |
| 10,477,717 B2* | 11/2019 | Hasija | .................... | H01R 9/24 |
| 2011/0001388 A1* | 1/2011 | Fujii | .................... | H02K 3/522 |
| | | | | 310/257 |
| 2015/0357886 A1* | 12/2015 | Ishizeki | ................ | H02K 5/225 |
| | | | | 310/71 |
| 2016/0036281 A1* | 2/2016 | Nakano | .................. | H02K 29/03 |
| | | | | 310/68 D |
| 2016/0105083 A1* | 4/2016 | Ishimaru | ................ | H02K 5/22 |
| | | | | 310/54 |
| 2016/0254732 A1* | 9/2016 | Kojima | .................. | H02K 11/33 |
| | | | | 310/68 R |
| 2016/0352189 A1* | 12/2016 | Yamada | ................. | H02K 5/225 |
| 2017/0201150 A1* | 7/2017 | Haga | ..................... | H02K 3/522 |
| 2017/0291635 A1* | 10/2017 | Yamasaki | ............ | H02M 7/003 |
| 2017/0346429 A1* | 11/2017 | Inamura | ................ | H02K 29/08 |
| 2017/0353084 A1* | 12/2017 | Kashihara | ............ | H02K 5/225 |
| 2018/0233992 A1* | 8/2018 | Takeuchi | ............... | H02K 11/33 |
| 2019/0214926 A1* | 7/2019 | Sato | ....................... | H02K 5/12 |
| 2019/0248406 A1* | 8/2019 | Kaneko | .................. | H02K 5/15 |
| 2020/0244114 A1* | 7/2020 | Tschida | .................. | H02K 29/08 |
| 2020/0336058 A1* | 10/2020 | Katou | .................... | H02K 21/16 |
| 2021/0001919 A1* | 1/2021 | Fujita | .................. | B62D 5/0484 |

FOREIGN PATENT DOCUMENTS

| | | |
|---|---|---|
| CN | 105122607 A | 12/2015 |
| DE | 202008008644 U1 | 11/2009 |
| DE | 102011084763 | 4/2013 |
| DE | 102012218847 A1 | 4/2014 |
| EP | 2244358 | 10/2010 |
| WO | 2007113030 A1 | 10/2007 |
| WO | 2014125982 A1 | 8/2014 |

* cited by examiner

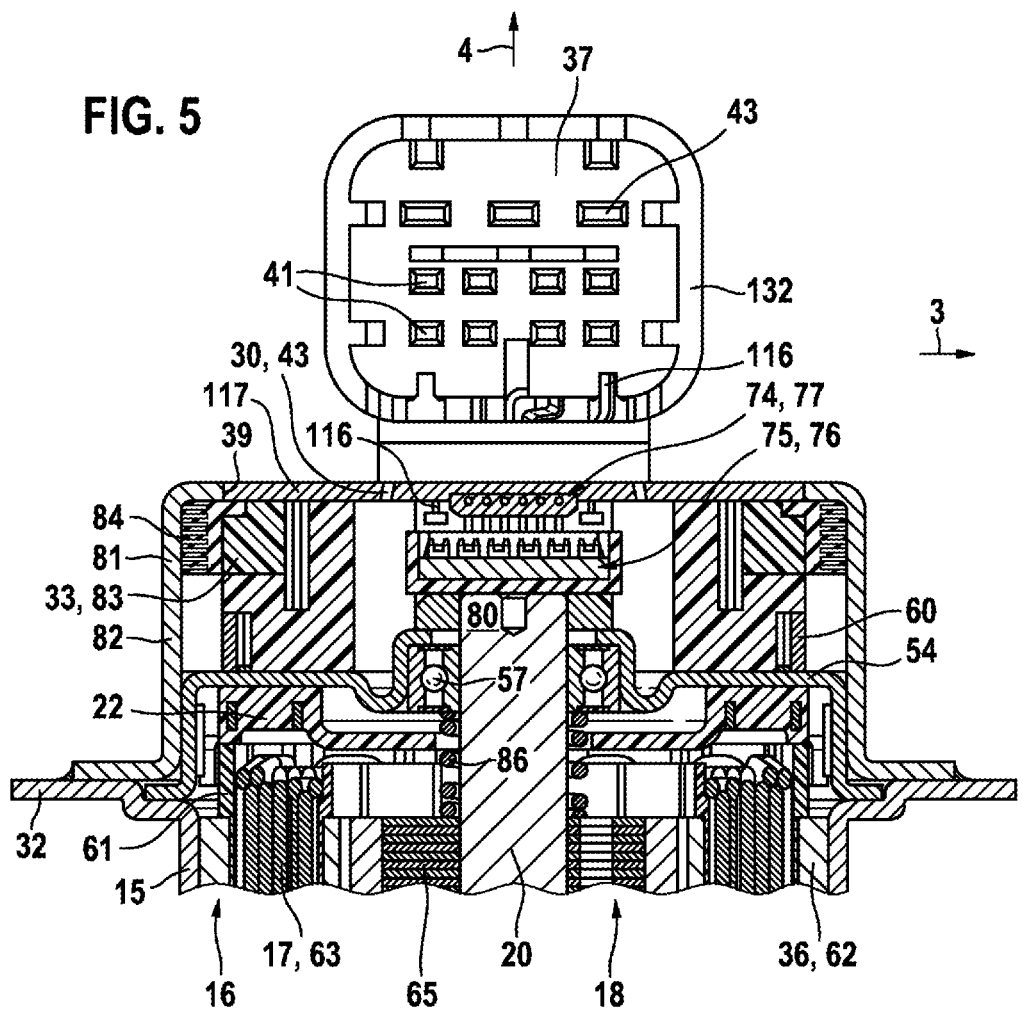

ELECTRICAL MACHINE, AND METHODS FOR PRODUCING AN ELECTRICAL MACHINE

BACKGROUND OF THE INVENTION

The invention relates to an electrical machine, and to a method for producing such an electrical machine.

An electrical machine is known from DE 10 2011 084 763 A1, in which a stator is arranged in a pole pot. A cover part is arranged on the pole pot, which incorporates a bearing for the rotor shaft. The cover part is formed of plastic, and comprises electrical conductor elements for the contacting of the electric winding of the stator. The cover part further comprises a lateral extension, which is configured as a plug-in connector. At one free end of the rotor shaft, a signal generator is arranged for the detection of the rotor position. In axial opposition to the signal generator, a circuit board is arranged, upon which a sensor element for the evaluation of signals is arranged, which is not represented in greater detail. A design of this type has a disadvantage, in that a circuit board of this type is not suitable for high-temperature applications, in which the soldered joints on the circuit board might become disconnected. There is also the risk that, in response to a high vibratory loading of the electrical machine, electrical contacts between the circuit board and the conductor elements of the plastic bearing plate are destroyed.

SUMMARY OF THE INVENTION

The device according to the invention and the method according to the invention, have the advantage in that, by means of the direct electrical contacting of the magnetic field sensor with the plug pin of the plug housing, a circuit board can be entirely omitted. This saves costs and, moreover, an electrical machine of this type can be operated at higher temperatures than a corresponding machine with a circuit board. So that the electrical machine can also withstand high vibratory loading, the sensor element is directly fastened to the inner wall of the plug housing. By the omission of a separate carrier for the sensor element, a potential source of oscillatory excitations of the magnetic sensor is eliminated.

By means of the measures described in the dependent claims, advantageous further developments and improvements of the forms of embodiment disclosed in the dependent claims are possible. The fastening of the magnetic field sensor to the plug housing by means of an adhesive, which is also suitable for high temperatures, is particularly advantageous. By this arrangement, the magnetic field sensor can lie flush to the inner side of the plug housing, thereby resulting in a robust connection which can withstand even high temperatures and high vibrations.

In order to permit the alignment of the magnetic sensor in relation to the signal generator of the rotor shaft, guide ribs are configured on the plug housing, which correctly position the sensor during the axial insertion thereof into the plug housing. The guide ribs are configured in the manner of a lead-in chamfer. Preferably, the guide ribs can simultaneously be configured as radial bearing surfaces for the magnetic sensor, in order to brace the latter in the plug housing.

In order to reliably maintain the magnetic field sensor in position during the adhesive bonding process, an elastically-configured compression rib is configured on the plug housing, which deforms during the insertion of the magnetic field sensor, by the action of a tensioning force.

With respect to temperature and vibration resistance, it is particularly advantageous if the terminal leg of the magnetic field sensor is welded directly to the plug pin. As this welding process is executed prior to the assembly of the plug housing, welding zones for the welding tools are freely accessible, such that electrical connections can be formed by means of resistance welding or laser welding in a problem-free manner.

As the magnetic field sensor, in its sensor housing, is arranged flush to the inner side of the plug housing, the terminal legs also advantageously extend in a parallel direction to the inner side of the plug housing which, in this region, is oriented approximately perpendicularly to the rotor shaft. The terminal legs, in the same position as the plug pin lead-in, can be oriented from the inner side outwards towards the plug-in connector.

Particularly advantageously, the plug pins are configured as insert components which are molded into the plug housing, and which project axially from the inner wall on the inner side of the plug housing. In this arrangement, the terminal legs are oriented transversely to the insert conductors. In a first variation, the terminal legs can be arranged directly on the end faces of the insert conductors, and welded to the latter. In a mutually-angled configuration of this type, a bifurcated contact can advantageously be configured in the interests of superior contacting. In an alternative embodiment, the terminal legs can be bent over in the axial direction, such that they are oriented in parallel to the insert conductors. In a further variation, the insert conductors are bent over transversely to the axis of rotation, and are thus oriented approximately in parallel to the terminal legs.

In a preferred embodiment, a capacitor is fastened to the inner side of the plug housing, which is connected to a capacitor contact by means of a first capacitor terminal. The capacitor contact is likewise configured as an insert conductor, and is connected to at least one of the insert conductors which is contacted with one of the terminal legs of the magnetic field sensor. Particularly advantageously, the capacitor can be adhered in a sleeve-shaped rim configured on the inner side of the plug housing.

In the same manufacturing process for the molding-in of the insert conductors for the magnetic field sensor, plug pins are also simultaneously molded into the plug housing which, subsequently, are to be electrically bonded to terminal pins on the interconnection board, for the supply of power to the electric coils.

These plug pins, in the same way as the insert conductors for the magnet field sensor and the capacitor contact, are preferably oriented axially inwards from the cover surface of the plug housing.

The signal generator, in a simple manner, can be fitted to the free end of the rotor shaft, such that the sensor magnet thereof is arranged in direct axial opposition to the magnetic field sensor. In its planar extension, the sensor magnet is preferably oriented transversely to the axis of rotation, such that the largest possible overlap is constituted with the magnetic field-sensitive surface of the magnetic field.

In order to set the plug housing in a clear rotational position in relation to the pole pot, axially upwardly-projecting centering elements are configured on the bearing plate which is attached to the pole pot. These centering elements engage with corresponding mating elements in the plug housing, such that no rotation of the plug housing relative to the pole pot is possible. In an analogous manner, centering elements can project axially downwards from the bearing plate, thereby cooperating with mating elements on the interconnection board of the stator, in order to set a clear rotational position of the interconnection board in relation to the pole pot. This centering ensures that the terminal pins of the interconnection board, further to the assembly of the plug housing, are in direct contact with the plug pins of the electric power supply.

The welded connection between the plug pins for the electric power contacts and the terminal pins of the interconnection board can advantageously be executed by means of welding tools, which can be inserted radially through corresponding radial windows in the plug housing. Likewise, in this manner, the free capacitor contact can be welded to a ground contact on the bearing plate.

In order to permit the accommodation of high vibratory loads, the plug housing is arranged axially on the flange of the pole pot, and is retained on the pole pot by means of a metal cover, which is shouldered on the plug housing. To this end, the metal cover is preferably welded to the pole pot. The plug-in connector projects axially upwards through a corresponding cut-out in the metal cover. In order to compensate different temperature expansions in the individual components over a wide temperature range, a pre-tensioned axial spring is arranged between the plug housing and the metal cover, which continuously compresses the plug housing against the pole pot. Likewise, an annular seal is arranged around the plug-in connector between the plug housing and the metal cover, which reliably seals the plug-in connector in relation to the housing of the electrical machine.

The production method for the electrical machine according to the invention has the advantage in that, by the pre-fitting of the magnetic field sensor to the inner side of the plug housing, further to the attachment of the plug housing to the pole pot, only the plug pins of the electric power contacts and, where applicable, a capacitor contact, require electrical connection to the stator. The contact lugs of the electric power supply can thus be welded, in a simple manner, to the terminal pins of the interconnection board. By the same principle, where applicable, the capacitor contact can be bonded to the ground contact of the bearing plate. On the grounds that, by this method, all the electrical contacts of both the power pins and the sensor pins can be welded, an electrical machine of this type is also suitable for use at high ambient temperatures, and at high external rates of acceleration.

By the welding of the bearing plate to the pole housing, a prefabricated subassembly can be constituted, in which the rotor is fully supported, both axially and radially. By the insertion of the stator components and the rotor in the pole pot, the fitting of axial spring elements permits the achievement of vibration damping, which is maintained over the entire service life of the electrical machine, even in the event of high vibratory loads. The welding of the bearing plate reinforces the overall structure of the electrical machine, and ensures the evacuation of heat from the electrical windings, thereby preventing any overheating of the magnetic field sensor. By the welding of the metal cover to the pole housing, the plug housing, together with the sensor, is maintained by the axial spring element at a constant clearance from the signal generator, such that the sensor signal for the detection of the rotor position remains consistently strong under all operating conditions. In this production method, all process steps can be executed in the axial direction, thus permitting the significant simplification of the construction of production lines.

BRIEF DESCRIPTION OF THE DRAWINGS

Exemplary embodiments of the invention are represented in the drawings, and are described in greater detail in the following description. In the drawings:

FIG. 5 shows a further exemplary embodiment of an electrical machine.

DETAILED DESCRIPTION

Figure 1:
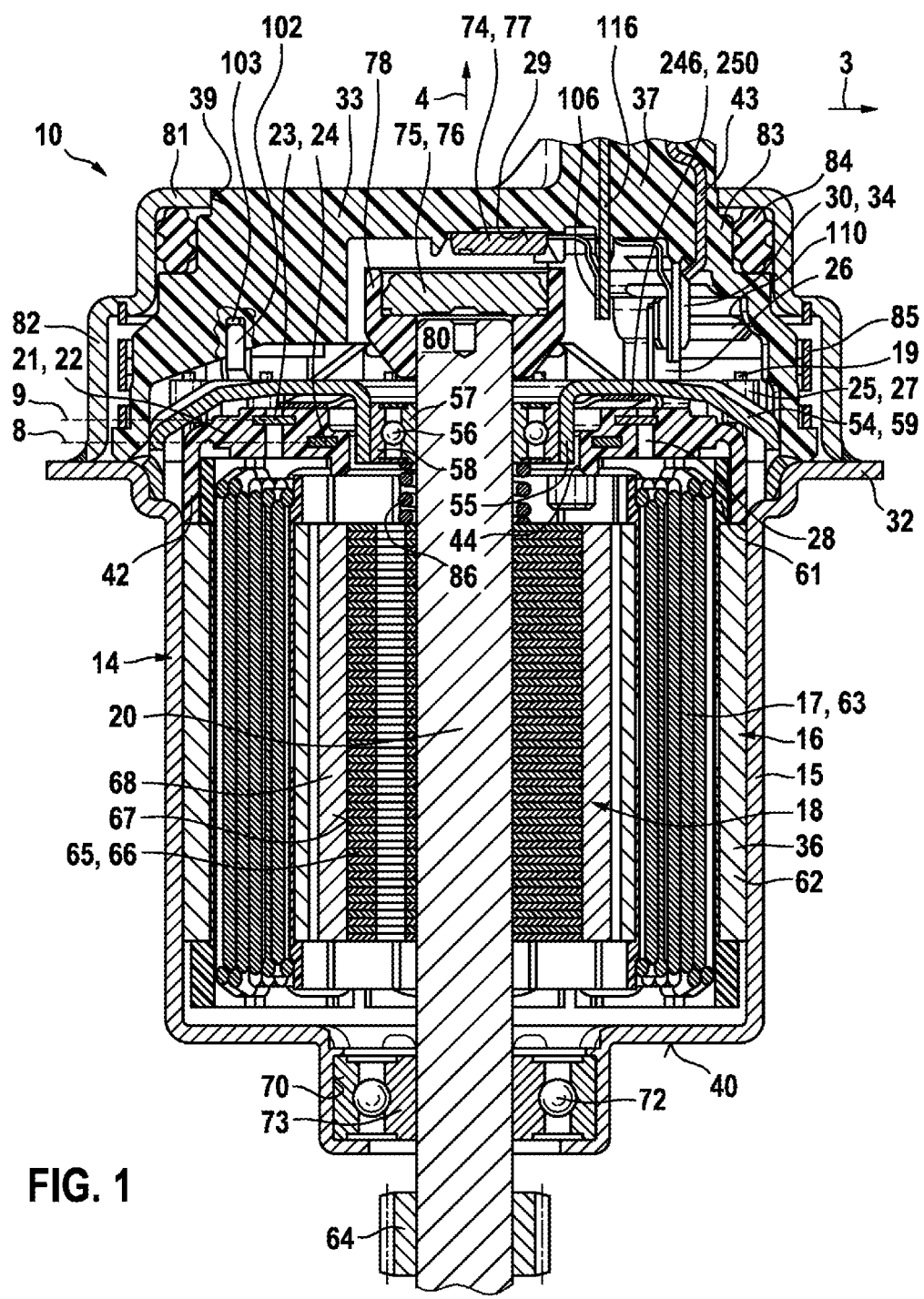
FIG. 1 shows a sectional view of a first exemplary embodiment of an electrical machine according to the invention.

FIG. 1 shows an exemplary embodiment of a fully-assembled electrical machine 10, in which a stator 16 is fitted in a housing 14 of an electrical machine 10. The stator 16 comprises coil frames 36, which are constituted, for example, as separate individual segments 62 and wound with electrical windings 17. The housing 14 functions as a pole pot 15, which constitutes a magnetic return path for the electrical windings 17. The pole pot 15, at its open end, incorporates a flange 32, upon which further components are fitted. In the exemplary embodiment according to FIG. 1, the pole pot 15, on its base surface 40, incorporates an opening, through which a rotor shaft 20 projects, in order to transmit the torque of the electrical machine 10 via a drive element 64 to an unrepresented gearing element. On the base surface 40, a first bearing seat 70 is molded, into which a first rolling bearing 72 is inserted. The inner ring 73 of the first rolling bearing 72 is securely attached to the rotor shaft 20. The first rolling bearing 72 thus constitutes a locating bearing for the rotor 18. The rotor 18 comprises a rotor body 65, which carries permanent magnets 68 which interact with the electrical windings 17. The rotor body 65 is comprised, for example, of individually stacked segmental plates 66, in which cut-outs 67 are punched out for the permanent magnets 68. The coil wire ends 19 of the windings 17 project above the electrical coils 63 in the axial direction 4. An interconnection board 22 is axially mounted on the stator 16, wherein conductor elements 23 which project from a plastic body 21 are bonded, on fastening sections 25, to the coil wire of the coils 63. The electrical connections between the coil wire and the fastening sections 25 are constituted, for example, by welding, soldering or crimping. In the exemplary embodiment described, exactly three conductor elements 23 respectively comprise a terminal pin 26 for the phases U, V and W. The plastic body 21 bears in the axial direction 4 on the stator 16, by means of molded-on spacers 42. The spacers 42 of the interconnection board 22 are molded onto the outer radial edge thereof. In the exemplary embodiment, the spacers 42 bear on the coil frame elements 36, on which the electrical windings 17 are wound. In this case, the coil frame elements 36 are configured as individual segments 62 for each coil 63. On each of the coil frame elements 36, an insulating mask 61 for the electrical windings 17 is respectively arranged. The plastic body 21 is configured to an annular design, such that the rotor shaft 20 of the rotor 18 projects through the central cut-out 44 thereof.

A bearing plate 54 is arranged axially above the interconnection board 22, the outer radial edge of which is welded to the pole pot 15. The bearing plate 54 incorporates a second bearing seat 55, which engages axially with the central cut-out 44 in the interconnection board 22. The second bearing seat 55 accommodates a second rolling bearing 56, by means of which the rotor shaft 20 is supported in the stator 16 in a rotatable manner. The second rolling bearing 56 is configured, for example, as a ball bearing, and constitutes a floating bearing for the rotor 18. To this end, an outer ring 58 of the second rolling bearing 56 is secured in the second bearing seat 55 in a non-rotating manner, and the inner ring 57 is secured to the rotor shaft 20 in an axially displaceable manner. The second rolling bearing 56 is thus axially arranged in approximately the same plane as the interconnection board 22, such that the electrical machine 10, in the axial direction 4, shows a highly compact design. In the exemplary embodiment, the bearing plate 54 incorporates individual radial webbings 59, between which the fastening sections 25, which are configured as receiving bushes 27, project axially upwards. Coil wire ends 19 of the coils 63 are inserted in perforations in the receiving bushes 27 and, for example in the axial direction 4, project upwards slightly beyond the receiving bush 27, and preferably above the bearing plate 54. The terminal pins 26 likewise extend from the plastic body 21 through the bearing plate 54, in order to permit the bonding thereof to corresponding contacts 30 of the plug-in connector 37. In the sectional representation of the plastic body 21, connecting sections 24 of various conductor elements 23 can be seen in cross-section. The cross-sections, which are shown in a flattened representation, are arranged in a mutually offset manner, both with respect to the axial direction 4 and with respect to the radial direction 3. Consequently, for example, four individual conductor elements 23 can be arranged in exactly two axial planes 8, 9. In the sectional representation, axial ducts 28 in the plastic body 21 can be seen, which originate from retaining tools for the conductor elements 23 in the injection-molding tool. For the purposes of vibration damping, the interconnection board 22 is compressed axially downwards from the bearing plate 54 against the coil frame 36 by means of axial spring means 246. The spring means 246 are configured, for example in the form of an axial spring washer, which encloses the rotor shaft 20. The spring washer is preferably configured as a corrugated disk 250, which bears axially on the bearing plate 54 and on the interconnection board 22. The spring means 246 generate an axial tensioning force, which maintains the interconnection board 22 in an exact position, even over a wide temperature range and in the event of high vibratory loads. The rotor 18 is axially tensioned vis-à-vis the second rolling bearing 56 by means of a compression spring 86. The compression spring 86 bears on one side on the rotor body 65, and on the other side on the inner ring 57 of the second rolling bearing 56.

Above the bearing plate 54, a plug housing 33 is arranged, upon which an external plug-in connector 37, which is not represented in greater detail, is arranged for the supply of electric power to the electrical machine 10. In the plug housing 33, on the inner side 29 thereof, electrical contacts 30 are arranged, which are connected to the terminal pins 26 of the interconnection board 22. The interconnection board 22 is connected to both the coil wire ends 19 and to the electrical contacts 30 of the plug-in connector 37. For example, the electrical contacts 30 extend axially downwards in the form of contact lugs 34, such that they are arranged immediately adjacently to the terminal pins 26, and can then, for example, be welded to one another. In order to ensure the correct positioning of the terminal pins 26 in the circumferential direction 2, the interconnection board 22 incorporates positioning elements, both with respect to the stator 16 and with respect to the bearing plate 54, which cooperate with corresponding mating elements. The plug housing 33 is likewise positioned with respect to the bearing plate 54 by means of an anti-rotation mechanism 103, 102. In the plug housing 33, a sensor element 74 is fastened, which cooperates with a signal generator 75 on the rotor shaft 20, in order to detect the rotor position thereof. To this end, further to the fitting of the bearing plate 54, a magnet holder 78 is press-fitted to the free end 80 of the rotor shaft 20, which accommodates a sensor magnet 76. The rotating magnetic field thereof is detected by the sensor element 74, which is configured as a high-resolution magnetic field sensor 77. A metal cover 81 is attached to the plug housing 33, which is welded to the flange 32 of the pole pot 15 in a leak-tight manner. Both the plug housing 33 and the metal cover 81 each comprise a circular circumferential wall 82, 83, which are arranged radially adjacently to each other. Between the plug housing 33 and the inner wall of the metal cover 81, a sealing ring 84 is press-fitted, which seals the electrical machine 10 in relation to the plug-in connector 37. Moreover, an axial spring element 85 is arranged between the plug housing 33 and the metal cover 81, which axially compresses the plug housing 33 against the flange 32 of the pole pot 15.

Figure 2:
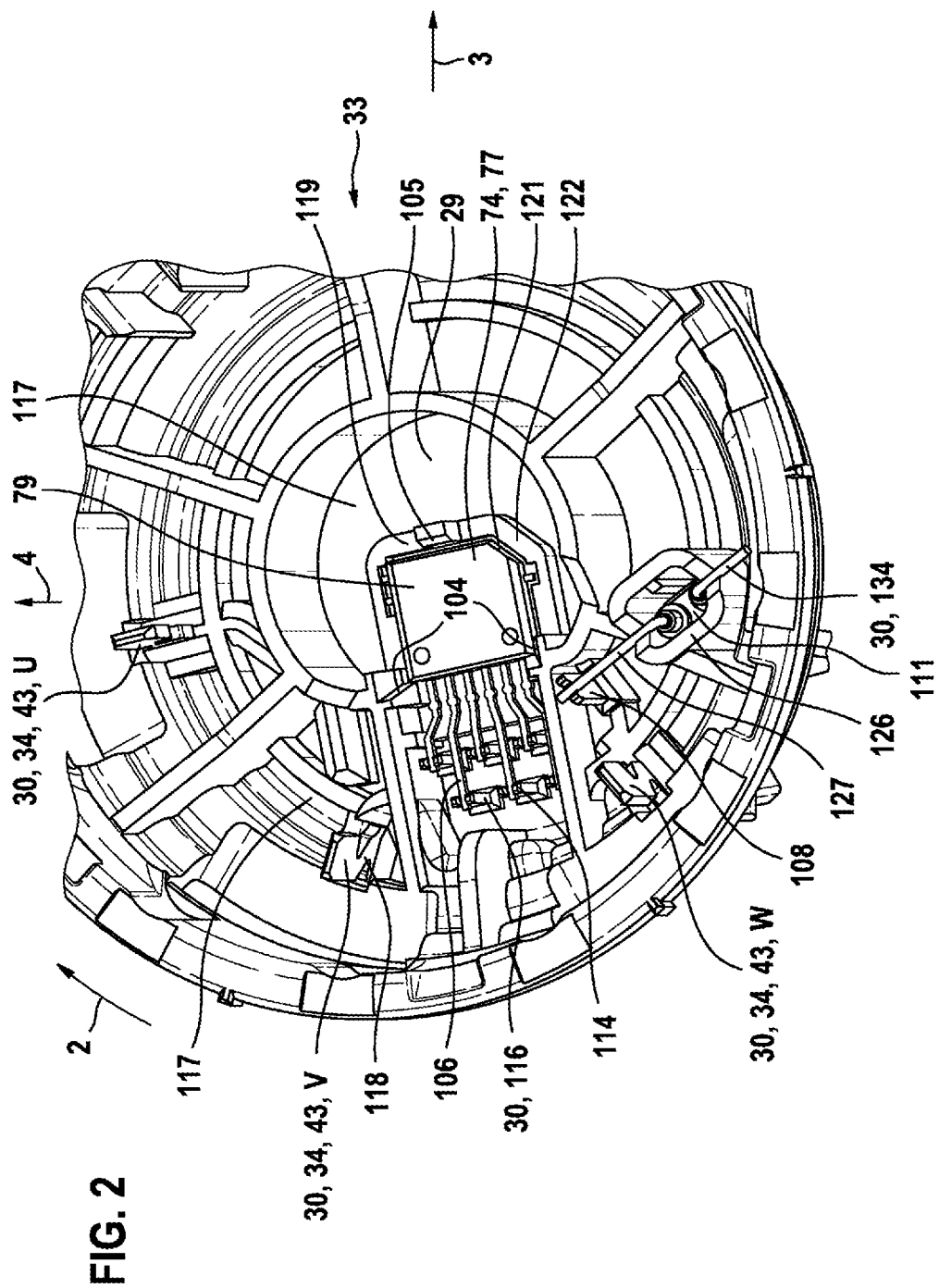
FIG. 2 shows an overhead view of the inner side of the plug housing according to FIG. 1.

FIG. 2 shows a view of the plug housing 33, before the latter is fitted to the pole pot 15. The plug-in connector 37, which projects axially from the outer side of the plug housing 33, is not visible in this representation. In the plug housing 33, electrical contacts 30 are molded into the plastic material of the cover wall 117 of the plug housing 33. The power pins 43, on the inner side 29 of the cover wall 117, form contact lugs 34 which project axially downwards. The contact lugs 34 preferably comprise an elastic region 118, in order to facilitate the welding of the contact lugs 34 to the corresponding terminal pins 26 on the interconnection board 22. In combination with the sprung regions, by which the terminal pins 26 are molded onto the interconnection board 22, the latter can compensate different temperature expansions over a wide temperature range. In the exemplary embodiment, exactly three contact lugs 34 are configured, which constitute the three power pins for the three phases U, V and W on the plug-in connector 37. Moreover, insert conductors 116 project from the inner side 29 of the plug housing 33, the opposing ends of which constitute the sensor pins 41 in the plug-in connector 37. In this case, the insert conductors 116 project axially from the cover wall 117 and, at their respective ends, incorporate a bifurcation 114, into which the terminal legs 106 of the sensor element 74 are inserted. The terminal legs 106 are thus routed along the inner side 29 of the cover wall 117, transversely to the rotor axis 4. The terminal legs 106 are then permanently welded to the bifurcations 114 of the insert conductors 116, preferably by resistance welding. In order to provide sufficient space for welding tools, the insert conductors 116 are arranged in two rows, each comprising, for example, three electrical contacts 30. Accordingly, one part of the contact lug 106 is configured to a shorter length, and another part to a longer length. The sensor element 74 comprises a sensor housing 79, from which the terminal legs 106 project laterally. The sensor housing 79 is configured to an approximately rectangular design, such that the base surface 115 thereof extends in a near-parallel arrangement to the cover wall 117. The sensor housing 79 is arranged within a receiving frame 119, which is configured on the inner side 29 of the cover wall 117. This receiving frame 119 forms a positive fit with the sensor housing 79 in the radial direction 3. In the exemplary embodiment, the sensor housing 79 incorporates a beveled corner 121, which engages with the bevel 122 in the receiving frame 119 in a form-fitted manner.

For the fitting of the sensor element 74 in the plug housing 33, guide ribs 104 are molded onto the inner side 29, on which the sensor housing 79 slides into the receiving frame 119. The sensor housing 79 is fitted in the axial direction 4, such that the guide ribs 104 constitute lead-in chamfers in the axial direction 4. In the exemplary embodiment, two guide ribs 104, which are configured at right angles to each other, are respectively arranged, which maintain the sensor housing 79 in its exact axial position. On the receiving frame 119, a compression rib 105 is configured, which secures the sensor housing 79 in the receiving frame 199, until the sensor element 74 is adhered into the plug housing 33.

Figure 3:
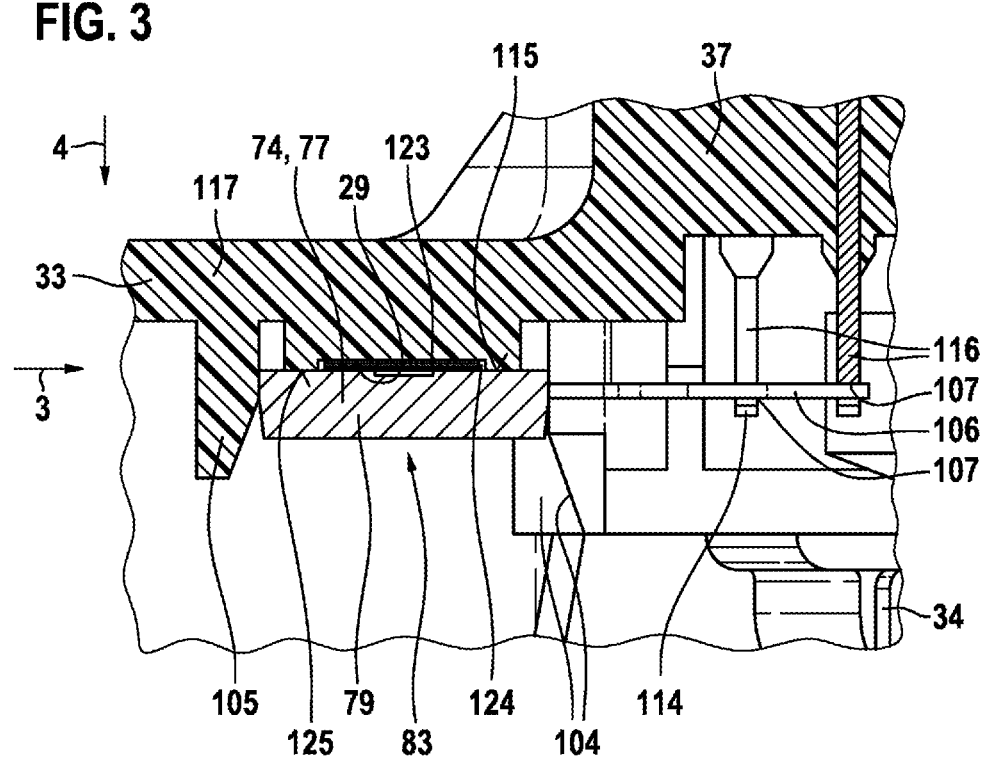
FIG. 3 shows a sectional representation of the plug housing according to FIG. 1, FIGS. 4a through 4c show schematic representations of alternative embodiments of the sensor contact arrangement.

To this end, FIG. 3 represents a sectional view of the plug housing 33 according to FIG. 2. An adhesive 123 is arranged between the base surface 115 of the sensor housing 79 and the inner side 29 of the plug housing 33, by means of which the sensor element 74 is adhered to the plug housing 33. On the left-hand side, in cross-section, the compression rib 105 is represented, which compresses the sensor housing 79 in the radial direction 3 against the opposing side of the receiving frame 119. In this region, two mutually angled guide ribs 104 are also represented, by means of which the sensor housing 79 has previously been exactly radially positioned within the receiving frame 119. In FIG. 3, the base surface 115 bears on bearing surfaces 125 of the plug housing 33, wherein a cavity 124 for the adhesive 123 is configured between the latter. The terminal legs 106 are oriented in parallel to the cover wall 117, and are welded into the bifurcations 114 in the insert conductors 116. The insert conductors 116 are molded into the plastic material of the plug housing 33 and, at their opposing ends, constitute the sensor pins 41 of the plug-in connector 37.

In FIG. 2, moreover, an interference suppression capacitor 111 is fastened to the inner side 29 of the plug housing 33. To this end, a capacitor locator 126 is configured on the inner side 29, into which the interference suppression capacitor 111 is adhered. In this case, the capacitor locator 126 is configured in the form of an axial bush, which accommodates the adhesive for the attachment of the interference suppression capacitor 111. A first capacitor terminal 127 is electrically connected to a capacitor contact 108, which is likewise molded into the plug housing 33 in the form of an insert component. The capacitor contact 108 is thus electrically connected to the sensor element 74. To this end, at least one insert conductor 116 for the terminal leg 106 incorporates an electrical connection to the capacitor contact 108. In this pre-assembly step, the second capacitor terminal 134 continues to be configured as a free connecting wire 134, and is only electrically connected to a corresponding ground contact on the bearing plate 54 after the fitting of the plug housing 33 to the pole pot 15.

Figure 6:
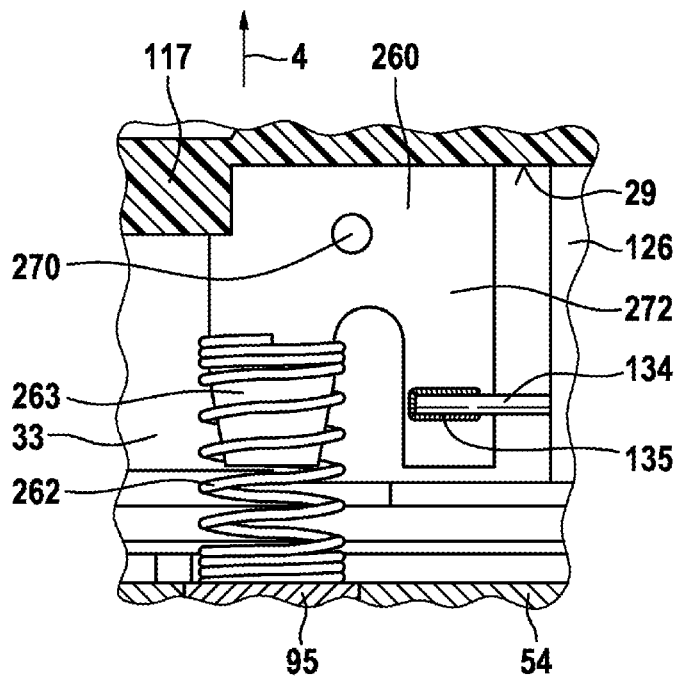
FIGS. 6 and 7 show detailed views of further exemplary embodiments.
Figure 7:
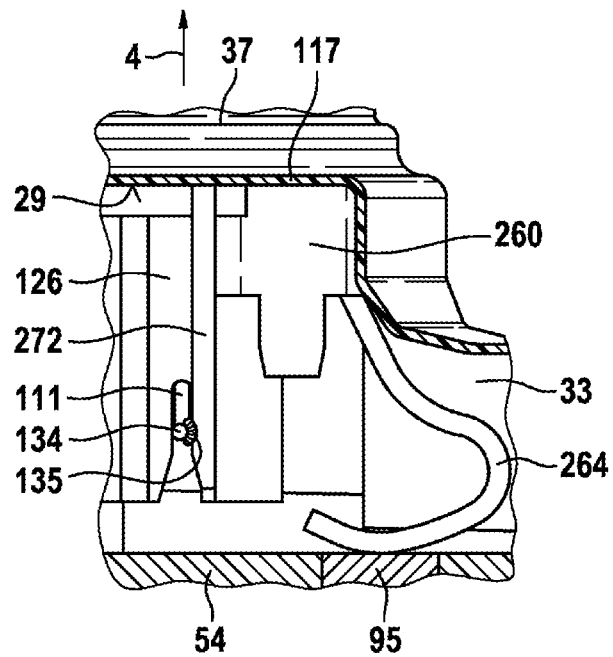

Alternatively, according to FIG. 6, the second capacitor contact 134 is connected to a contact element 260, preferably by means of a welded connection 135 to a contact tongue 272 of the contact element 260. The contact element 260 is fastened to the plug housing 33 for example by molding-in to the latter. On the contact element 260 a contact spring 262 is attached, and is thus electrically bonded to the contact element 260. The contact spring 262 extends in the axial direction 4 to the bearing plate 54. In FIG. 6, the contact spring 262 is configured as a helical spring, which is directly fitted onto an axially tapering projection 263 on the contact element 260. If the plug housing 33, with the contact element 260, is fitted to the pole pot 15, the contact spring 262 applies axial pressure to the bearing plate 54, and thus constitutes a ground contact 95 to the pole housing 15. In place of the separate contact spring 262, as represented in FIG. 7, the contact element 260 can also comprise an integral spring arm 264, which extends in the axial direction 4 and, upon the fitting of the pole pot 15, and thus of the contact element 260, directly constitutes the ground contact 95 with the bearing plate 54. The second capacitor contact 134 in turn is preferably bonded by means of a welded joint 135 to the contact tongue 272 of the contact element 260.

Figure 4A:
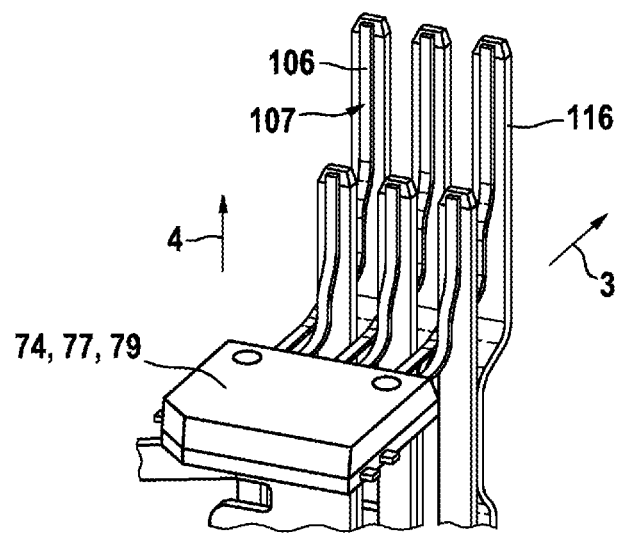
Figure 4B:
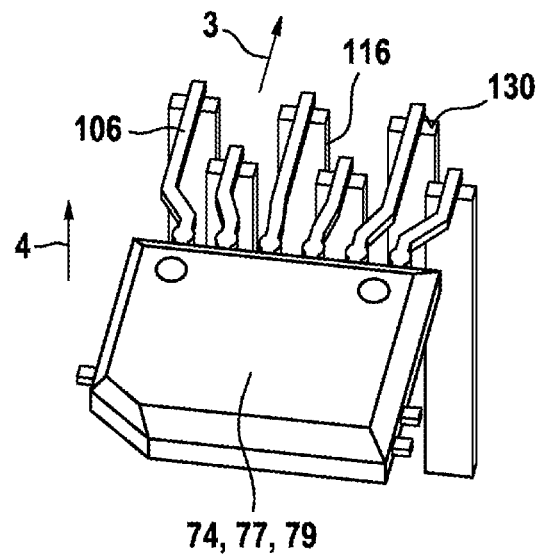
Figure 4C:
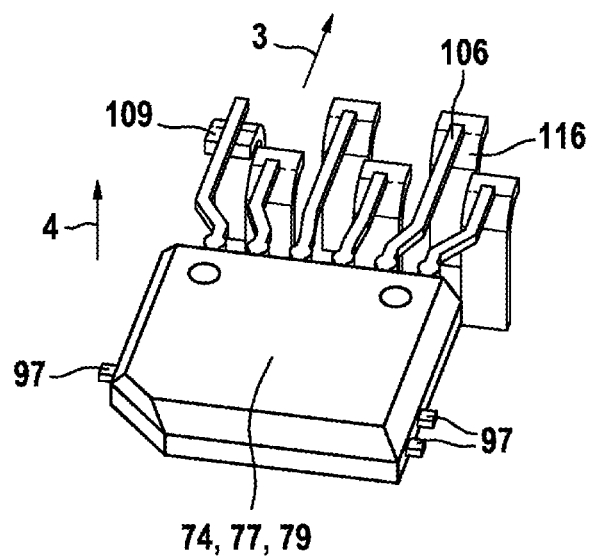

A plurality of variants for the electrical contacting of the sensor element 74 with the insert conductors 116 of the plug housing 33 are represented in FIG. 4. In FIG. 4a, the insert conductors 116 are routed in the axial direction 4 from the cover wall 117. All the terminal legs 106 of the sensor element 74 are bent through an approximate right angle, such that these are also oriented in the axial direction 4. By this arrangement, the contact lugs 106, in the contacting region 107, are oriented in mutually parallel arrangement to the insert conductors 116 and, in this manner, can be bonded to the latter by welding. The insert conductors 116 in turn—as also represented in FIGS. 4b and 4c—are configured in a mutually offset arrangement in the radial direction 3, in order to simplify the welding process. In FIG. 4b, the free ends of the insert conductors 116 in turn extend in the axial direction 4. The terminal legs 106 are oriented transversely thereto (in the radial direction 3), such that these bear on the free end faces 130 of the insert conductors 116. Accordingly, the terminal legs 106 are welded directly to the free end faces 130 of the insert conductors 116. In the variant according to FIG. 4c, the insert conductors 116 are bent over, such that the ends thereof extend transversely to the axial direction 4. As the terminal legs 106 likewise extend transversely to the axial direction 4, these are positioned parallel to the ends of the insert conductors 116, and are mutually bonded by welding accordingly. The ends of the insert conductors 116 can be bent radially away from the sensor housing 79, or also in the direction of the sensor housing 79 (the left-hand insert conductor 109 in FIG. 4c). Where applicable, the terminal legs 106 are mutually splayed within the plane transverse to the axial direction 4, in order to provide sufficient space for the welding process. In FIG. 4, it can also be seen that further metal contacts 97 project from the sensor housing 79. These constitute the remainder of the separated lead-frame 97, upon which the corresponding processors are arranged within the sensor housing 79. For the production of the sensor elements 74, the processors are electrically contacted on the lead-frame 97, and molded thereafter into the sensor housing 79. The lead-frame 97 is then separated between the sensor housings 79 constituted by the molding process.

FIG. 5 represents a further exemplary embodiment of a fully-assembled electrical machine 10. The plug-in connector 37 is arranged axially above the cover wall 117 on the outer side of the plug housing 33. The plug-in connector 37 is angled through a right angle in the radial direction 3, such that the power pins 41 and the sensor pins 43 are also oriented in the radial direction within the connector shroud 132. The power pins 43 terminate on the inner side 29 in the form of contact lugs 34, which are connected to the terminal pins 26 on the interconnection board 22. The sensor pins 41 terminate on the inner side 29 in the form of insert conductors 116, which are electrically contacted with the terminal legs 106 of the magnetic field sensor 77. The sensor pins 41 and the power pins 43 are respectively configured as single-part bent stampings, preferably of copper, which are inserted in the tooling mold in conjunction with the injection-molding of the plug housing 33. Further to the fitting of the plug housing 33 to the bearing plate 54, a metal cover 81 is attached over the plug housing 33, which is then fastened to the pole pot 15. The metal cover 81 comprises a cylindrical wall 82, which fully encloses the plug housing 33 over the entire circumference. A seal 84 having a plurality of sealing lips is arranged radially between the circumferential wall 82 of the metal cover 81 and the radial outer wall 83 of the plug housing 33. The plug-in connector 37 projects out of the metal cover 81 through a cut-out 39 which is formed on the axial side of the metal cover 81. By means of the radial seal 84, the plug-in connector 37 is sealed in relation to the metal cover 81. Conversely, the metal cover 81 is welded to the flange 32 of the pole pot 15 in a leak-tight manner. The magnetic field sensor 77 is arranged in the center of the cover wall 117, in direct axial opposition to the sensor magnet 76, which is fastened at the free end 80 of the rotor shaft 20.

In the method for producing the electrical machine 10 according to the invention, the stator 16 is firstly fitted in the pole pot 15. To this end, the coil frames 36, configured as individual segments 62, are fitted with an insulating mask 61 and are wound with electrical windings 17, prior to the insertion thereof into the pole housing 15. Thereafter, the rotor 18 is inserted axially into the pole pot 15, such that the rotor shaft 20 is securely press-fitted into the first rolling bearing 72. Thereafter, the interconnection board 22 is arranged axially on the coils 63, and is electrically bonded to the coil wire ends 19, preferably by welding. Thereafter, the compression spring 86 is axially attached to the rotor body 65 wherein, by the fitting of the bearing plate 54, the compression spring 86 is axially tensioned by the inner ring 57. Simultaneously, the bearing plate 54 is axially tensioned vis-à-vis the interconnection board 22 by means of the axial spring means 246. Under the action of this tensioning, the bearing plate 54, at the radial outer ends thereof, is welded to the pole pot 15. The first centering lug of the bearing plate 54 engages with corresponding mating elements in the interconnection board 22. Further to the attachment of the bearing plate 54 by welding, the rotor 18 is reliably supported in the pole pot 15, both radially and axially, in an oscillation-damping manner. In this state, the terminal pins 26 and the second centering lug 102 project axially upwards, such that the plug housing 33, with its associated mating element 103, can be axially attached to the centering lug 102. The plug housing 33 thus bears axially on the flange 32 of the pole pot 15. Through the radial windows 110 in the plug housing 33, the terminal pins 26 can be welded to the electrical contacts 30 of the plug housing 33. Likewise, the interference suppression capacitor 111 of the plug housing 33 can be welded to the ground contact 95 on the bearing plate 54, or the contact spring 262 or spring arm 264 can be compressed against the bearing plate 54. Thereafter, the sealing ring 84 is attached to the plug housing 33 and, upon the fitting of the metal cover 81, is tensioned vis-à-vis the latter. The metal cover 81 in turn bears on the flange 32 and, over the entire circumference, is welded to the pole pot 15 in a leak-tight manner. By this arrangement, the axially upwardly projecting plug-in connector 37 is reliably sealed in relation to the housing 14 of the electrical machine 10. In order to offset different material expansions of the individual components over a wide temperature range, an axial spring 85 is arranged between the metal cover 81 and the plug housing 33, which axially compresses the plug housing 33 against the pole pot 15.

It will be observed that, with respect to the exemplary embodiments represented in the figures and in the description, multiple mutual combinations of the individual characteristics are possible. Thus, for example, the physical configuration and the electrical contacting of the sensor element 74 can be varied. Likewise, the position of the contact lugs 34 and the insert conductors 16 can be adapted to the corresponding plug housing 33. The configuration of the plug-in connector 37 and the signal generator on the rotor shaft 20 can be varied in accordance with customer requirements. The electrical machine 10 is preferably intended for application in a gearing and drive unit as an engine compartment actuator in the vehicle, for example for the actuation of moving parts or the operation of pumps in the engine compartment, but is not restricted to such applications.

The invention claimed is:

1. An electrical machine (10), having a pole pot (15), in which a stator (16) and a rotor (18) are accommodated, and a plug housing (33) with an integrated plug-in connector (37) is arranged axially on an open side of the pole pot (15), wherein a rotor shaft (20) of the rotor (18) projects with a free end (80) axially out of the pole pot (15) into the plug housing (33), and a magnetic signal generator (75) for rotational position detection is arranged at the free end (80), which magnetic signal generator (75) interacts with a magnetic field sensor (77) in axial opposition thereto, characterized in that the magnetic field sensor (77) is configured as a wired single-part component, and is fastened directly to an inner side (29) of the plug housing (33), without the use of a circuit board, and a receiving frame (119) is configured circumferentially around the magnetic field sensor (77), and forms a positive fit with the magnetic filed sensor (77) wherein the magnetic field sensor (77) comprises a sensor housing (79), configured to an approximately rectangular design, one corner of which is beveled.

2. The electrical machine as claimed in claim 1, characterized in that the magnetic field sensor (77) is directly adhesively bonded to the inner side (29).

3. The electrical machine as claimed in claim 1, characterized in that guide ribs (104) are molded onto the inner side (29), by means of which the magnetic field sensor (77) is maintained in an exact position in relation to the signal generator (75).

4. The electrical machine (10) as claimed in claim 1, characterized in that at least one compression rib (105) is molded onto the inner side (29), by means of which the magnetic field sensor (77) is secured, pending the curing of the adhesive (120).

5. The electrical machine (10) as claimed in claim 1, characterized in that a receiving frame (119) is configured circumferentially around the magnetic field sensor (77), and forms a positive fit with the magnetic field sensor (77).

6. The electrical machine (10) as claimed in claim 1, characterized in that further contact lugs (34) project axially on the inner side (29) which, on one side, are routed to the plug-in connector (37) in the form of power pins (43) and, on an other side, are electrically connected to the terminal pins (26) of an interconnection board (22), which energizes the electrical windings (17) of the stator (16).

7. The electrical machine (10) as claimed in claim 1, characterized in that a magnet holder (78) is press-fitted to the free end (80) of the rotor shaft (20), in which a sensor magnet (76) is arranged by way of a signal generator (75).

8. The electrical machine (10) as claimed in claim 1, characterized in that a bearing plate (54) for the rotor shaft (20) is arranged axially between the plug housing (33) and the interconnection board (22), wherein the bearing plate (54) comprises axial centering elements (60) and/or cut-outs for the accommodation of centering mating elements, by means of which the plug housing (33) is positioned above the bearing plate (54) in its rotational position with respect to the interconnection board (22).

9. The electrical machine (10) as claimed in claim 1, characterized in that the plug housing (33) is formed of plastic, and with an outer radial edge (112) bears axially on the pole pot (15), and a metal cover (81) is axially attached above the plug housing (33), which is welded to the pole pot (15) in a leak-tight manner, wherein the plug-in connector (37) projects outwards through a cut-out (39) in the metal cover (81).

10. The electrical machine (10) as claimed in claim 1, characterized in that the magnetic field sensor (77) comprises a plurality of terminal legs (106) which are electrically connected to insert conductors (116) in the plug housing (33) by resistance or laser welding, wherein the insert conductors (116) terminate in the form of sensor pins (41) in the plug-in connector (37).

11. The electrical machine (10) as claimed in claim 1, characterized in that a magnet holder (78) is press-fitted to the free end (80) of the rotor shaft (20), in which a 2-pole sensor magnet (76) is arranged by way of a signal generator (75), and is adhered therein.

12. The electrical machine (10) as claimed in claim 1, characterized in that a bearing plate (54) for the rotor shaft (20) is arranged axially between the plug housing (33) and the interconnection board (22), wherein the bearing plate (54) comprises axial centering lugs (100, 102) which are bent over in the axial direction (4) and/or cut-outs for the accommodation of centering mating elements, by means of which the plug housing (33) is positioned above the bearing plate (54) in its rotational position with respect to the interconnection board (22).

13. The electrical machine (10) as claimed in claim 1, characterized in that the magnetic field sensor (77) comprises a plurality of terminal legs (106) which are electrically connected to insert conductors (116) in the plug housing (33), wherein the insert conductors (116) terminate in the form of sensor pins (41) in the plug-in connector (37).

14. The electrical machine (10) as claimed in claim 13, characterized in that the insert conductors (116) project axially on the inner side (29) of the plug housing (33), and the terminal legs (106), in a plane transverse to the axial direction (4), are brought out of the sensor housing (79) of the magnetic field sensor (77).

15. The electrical machine (10) as claimed in claim 13, characterized in that the insert conductors (116) or the terminal legs (106) are bent over, as a result of which the insert contacts (30) and the terminal legs (106) are configured in a mutually parallel arrangement in the contacting region (107).

16. The electrical machine (10) as claimed in claim 13, characterized in that, on the inner side (29), a capacitor contact (108) is configured as an insert component, which is electrically connected to the insert conductors (116) for the terminal legs (106), and the capacitor contact (108) is connected to an interference suppression capacitor (111) which is arranged on the inner side (29) of the plug housing (33).

17. The electrical machine (10) as claimed in claim 13, characterized in that, on the inner side (29), a capacitor contact (108) is configured as an insert component, which is electrically connected to the insert conductors (116) for the terminal legs (106), and the capacitor contact (108) is connected to an interference suppression capacitor (111) which is arranged on the inner side (29) of the plug housing (33), and is adhesively bonded in a capacitor locator (126).

18. A method for producing an electrical machine (10) as claimed in claim 13, characterized in that, firstly, the magnetic field sensor (77) is fastened to the inner side (29) of the plug housing (33) and the terminal legs (106) thereof are welded to insert conductors (116) in the plug housing (33) and, further to the fitting of the plug housing (33) on the pole pot (15), the contact lugs (34) on the plug housing (33) for the supply of power to the electrical winding (17) are welded to the corresponding terminal pins (26) on the interconnection board (22).

19. The method for producing an electrical machine (10) as claimed in claim 18, characterized in that stator coils (63), with the electrical windings (17), are fitted in the pole pot (15), whereafter the rotor (18) is inserted into the pole pot (15), whereafter the interconnection board (22) is fitted to the stator (16) and is bonded to the electrical windings (17), whereafter the bearing plate (54) for the rotor (18) is permanently welded to the pole pot (15), whereafter the magnetic signal generator (75) is fastened to the free end (80) of the rotor shaft (20), and whereafter the plug housing (33), with the magnetic field sensor (77), is fastened in axial opposition to the signal generator (75).

\* \* \* \* \*